United States Patent Office 3,105,783 Patented Oct. 1, 1963

3,105,783
PROCESS OF PREPARING PRINTING PLATES
Harold B. Parkinson, Gardner, Ill.
No Drawing. Filed Apr. 4, 1960, Ser. No. 19,508
4 Claims. (Cl. 156—14)

The present invention relates to a method of preparing printing plates. More particularly, the invention is directed to an improved process for preparing aluminum letterpress plates in which said plates are etched with acid solutions.

In forming a printing plate, it is customary to apply a light sensitive material called an "enamel" to the surface of an acid-soluble metal. The "enamel" is usually either bichromated gelatin or bichromated albumen. These products contain salts such as aluminum dichromate within an albumen or gelatin carrier. The coated plate is exposed to light beneath a half-tone negative in order to produce the desired image on the surface of the metal. The "exposed" coated surface is then developed to form an image which is acid resistant. In this stage of the process, the enamel is usually desensitized by washing the surface of the metal with gum arabic and water. The plate is then coated with a grease receptive enamel or "developer." The developer adheres to the exposed portions of the plate but not to the nonexposed areas. Heat is applied to the metal in order to harden the enamel. The surface of the metal at this time contains a large number of dots due to action of the half-tone screen.

The etching step is usually carried out using dilute nitric acid solutions. In the case of aluminum, however, it is essential that hydrochloric acid be used in the process. The acid solution attacks the portions of the metal from which the light sensitive materials have been removed. The remaining areas of the plate are protected by the hardened coating which is called a "resist."

As soon as the acid penetrates the surface of the metal the acid begins to undercut the image which is then in relief. For this reason, it is necessary to wash away the etching solution, dry the image, and treat the metal with an acid resisting material immediately after the initial acid attack. A method that is commonly used to protect the image from lateral attack involves powdering the plate with an etching powder which is usually the so-called "dragon's blood." After the sides of the image have been protected, a second etch is carried out. This exposes additional portions of the image. The etched object is once more rinsed, dried, and given a second protective treatment after which the etching process is again performed.

One of the problems involved in preparing letterpress plates by the above method is that considerable time is consumed in separately applying an etching solution and a protective coating. Additionally, it often is difficult to apply the protective powder or substance selectively to the sides of the exposed image.

Inasmuch as aluminum is a lightweight and relatively inexpensive metal, many attempts have been made to adapt this material to conventional etching processes. These attempts have not been entirely successful, partly because it is difficult to control "deep" etching when treating aluminum by these methods. Additionally, certain acids such as nitric acid will not etch this metal.

It is an object of the present invention to provide a new and improved method of preparing letterpress plates.

Another object of the invention is to provide a method of preparing letterpress plates which does not require the use of expensive equipment.

It is another object of the invention to provide a method of etching aluminum which does not require the separate application of acid and protective substance.

Still another object is to provide a method of etching aluminum which effectively prevents "undercutting."

Another object is to provide a method of etching aluminum which does not require the use of "dragon's blood."

Another object is to provide a method of preparing aluminum printing plates which effectively controls "deep" etching.

Other objects will become apparent to those skilled in the art from the following detailed description of the invention.

In general, the present invention comprises the discovery that an etching agent comprising aqueous hydrochloric acid and a suitable oil provides significant advantages over known etching compositions. In a preferred embodiment of the invention the hydrochloric acid and oil are applied to the surface of a prepared aluminum plate along with red lithograph ink. A fine grain rubber swab can be used advantageously to place the composition in contact with the plate.

In the present method, a presensitized aluminum plate containing a coating of bichromated albumen, gelatin, or the like, is exposed to a half-tone negative having at least sixty dots per square inch. It is preferred but not essential that the time of exposure be at least doubled over conventional methods. This provides a tighter bond of the exposed layer to the plate. The plate is then washed in a customary manner with gum arabic which desensitizes the coating, and then with water. A commercial grease receptive enamel or developer is applied to the exposed surface. The enamel adheres to the hardened exposed layer but not to the other areas of the plate.

Following the application of the developer, the plate is baked to harden the enamel and the albumen layer beneath the enamel. This provides an acid resistant coating which corresponds to the image. The plate is then washed with vinegar (acetic acid) which dissolves the grease and other impurities.

As was pointed out above, the essence of my invention lies in the use of particular ingredients and a particular technique in etching the pretreated plate. This technique includes initially etching the plate with an aqueous solution of hydrochloric acid. The commercially available 37% HCl solution is suitable for this purpose. The acid solution can be more or less concentrated as desired. The less concentrated solutions, of course, will require longer etching times. The solution is applied by lightly passing a swab soaked with the solution over the treated plate. Only a sufficient amount of acid is employed to penetrate the hard, polished layer which is given to aluminum plate during its formation. The acid exposes the dull gray undersurface of the plate. The dot areas of the plate (the image is in the form of dots) are protected by the resist.

Following the initial etch, the swab is dipped into both an oil and a hydrochloric acid solution. The swab is then applied in all four directions on the plate. If etching proceeds too rapidly the process can be slowed by rubbing an onion or a piece of garlic over the surface of the plate. Any suitable oil can be used in this step of the process. It has been found that ordinary motor oil of from about 20 to about 80 SAE is satisfactory for this process. In a preferred embodiment of the invention, red lithograph ink is applied to the plate along with the oil and acid.

As the etching proceeds, acid contacts the plate causing its temperature to rise several degrees. Due to its higher specific gravity the acid collects in the lowest region of the etch while the oil forms a film along the sides and shoulders of the dots. The oil also controls the temperature of the plate, especially along the sides of the image. Where ink is also applied to the plate this reinforces the action of the oil and protects the shoulders and sides of the dots.

After the etching operation slows down considerably due to the formation of residues, the plate is thoroughly washed with water and dried. This step removes the oil and acid but leaves the ink adhering to the sides and top of the dots. The plate is again baked which darkens and hardens the ink. The process beginning with the step of dipping of the swab into oil, ink, and acid and applying the swab to the plate is again repeated to increase the depth of the etch. The etching, washing and heat hardening steps can be carried out as many times as is necessary to etch the metal adequately.

The subject process has many advantages over conventional methods of etching metals and in particular methods of etching aluminum. The combination of acid and oil, with or without ink, controls deep etching which formerly presented serious problems in the formation of printing plates. The simultaneous application of acid, ink and oil effectively prevents undercutting of the dots. This feature also speeds up the process by eliminating the separate application of the protective coating.

In my process, the amount of acid, oil and ink used can vary according to particular needs. In general, the acid and oil ratio should be from about 25% to about 75% to about 75% to about 25% by volume. The amount of ink mixed with the oil and acid can vary widely. It has been found that about 10% by weight by volume of ink is suitable for most purposes. My preferred composition contains about 45% acid solution (37% concentration), 45% oil, and 10% ink.

Obviously, many modifications and variations of the invention as hereinbefore set forth may be made without departing from the spirit and scope thereof, and therefore only such limitations should be imposed as are indicated in the appended claims.

I hereby claim:

1. A process for etching an aluminum printing plate wherein an image has been formed on said plate by photographic means and wherein said image has been protected by an acid resistant coating which comprises: applying hydrochloric acid to the surface of said plate to provide an initial etch, and thereafter contacting the entire surface of the plate with a swab containing an oil and hydrochloric acid, said oil having a specific gravity less than the specific gravity of said hydrochloric acid, the ratio of acid to oil by volume being from about one part acid and three parts oil to about three parts acid and one part oil.

2. A process as in claim 1 wherein the oil is a motor oil having an SAE rating of from about 20 to about 80 and wherein the aqueous acid solution is a 37% hydrochloric acid solution.

3. In a process of etching an aluminum printing plate wherein an image has been formed on said plate by photographic means and wherein said image has been protected by an acid resistant coating, the improvement which comprises applying hydrochloric acid to said plate to provide an initial etch and thereafter applying in all four directions to the surface of said plate a swab containing an oil, hydrochloric acid, and red lithograph ink, said oil having a specific gravity less than the specific gravity of said hydrochloric acid, the ratio of acid to oil by volume being from about 1 part acid and 3 parts oil to about 3 parts acid and 1 part oil; washing said plate thoroughly with water when the etching action of the acid slows down considerably; heating said plate to darken and harden said ink; and thereafter again applying said swab containing distinct layers of acid, ink, and oil to the surface of said plate.

4. A process as in claim 3 wherein the oil is a motor oil having an SAE rating of from about 20 to about 80 and wherein the aqueous acid solution is a 37% hydrochloric acid solution.

References Cited in the file of this patent

UNITED STATES PATENTS

| | | |
|---|---|---|
| 2,210,923 | Jacquerod et al. | Aug. 13, 1940 |
| 2,441,300 | Vande Bunte | May 11, 1948 |
| 2,506,164 | Morse | May 2, 1950 |
| 2,556,626 | Meulendyke | June 12, 1951 |
| 2,640,765 | Easley et al. | June 2, 1953 |
| 2,962,364 | Cornish | Nov. 29, 1960 |
| 2,979,387 | Easley et al. | Apr. 11, 1961 |